(12) United States Patent
Rettig

(10) Patent No.: US 6,515,594 B1
(45) Date of Patent: Feb. 4, 2003

(54) REMOTE CONTROLLED MEASUREMENT ARRANGEMENT AND PROCESS FOR REMOTE CONTROLLED OPERATION OF SEVERAL MEASURING POINTS

(75) Inventor: Ulrich Rettig, Wiclenbach (DE)

(73) Assignee: WTW Wissenschaftlich-Technische Werkstatten (DE)

(*) Notice: Subject to any disclaimer, the term of this patent is extended or adjusted under 35 U.S.C. 154(b) by 0 days.

(21) Appl. No.: 09/442,290

(22) Filed: Nov. 19, 1999

Related U.S. Application Data

(63) Continuation-in-part of application No. 08/873,407, filed on Jun. 12, 1997.

(30) Foreign Application Priority Data

Jun. 12, 1996 (DE) .......................................... 196 23 546

(51) Int. Cl.[7] .............................................. G08C 19/16
(52) U.S. Cl. ................................ 340/870.27; 340/10.1; 340/10.32
(58) Field of Search ....................... 340/870.27, 825.49, 340/10.1, 1.34, 870.28, 10.32

(56) References Cited

U.S. PATENT DOCUMENTS

| | | | |
|---|---|---|---|
| 4,766,295 A | * | 8/1988 | Davis et al. ................. 235/383 |
| 4,851,708 A | | 7/1989 | Palmer |
| 4,868,893 A | | 9/1989 | Hammond |
| 5,530,896 A | | 6/1996 | Gilbert |
| 5,539,393 A | * | 7/1996 | Barfod ....................... 340/10.1 |
| 5,565,855 A | | 10/1996 | Knibbe |
| 5,594,740 A | | 1/1997 | LeDue |
| 5,640,164 A | * | 6/1997 | Gunnarsson ............. 340/10.34 |
| 5,768,277 A | | 6/1998 | Ohno et al. |
| 5,828,315 A | | 10/1998 | Goodwin, III |
| 5,995,015 A | * | 11/1999 | DeTemple ............. 340/825.49 |
| 6,269,342 B1 | * | 7/2001 | Brick et al. ................... 705/20 |

\* cited by examiner

*Primary Examiner*—Timothy Edwards, Jr.
(74) *Attorney, Agent, or Firm*—Cantor Colburn LLP

(57) ABSTRACT

Two different types of data transfer are provided. The first type of data transfer takes place between a data transfer device and each individual measuring point. This first type of data transfer requires close physical relation between the data transfer device and the measuring point. The measuring point is provided with a marker, or a marker is retrieved, within the framework of this data transfer. Then a second type of data transfer between a central control and the measuring point is realized. Measurement data, control data, and, if necessary, configuration data are transferred within the framework of this second data transfer. The marker can be made application specific or sample specific by means of this procedure of the measurement arrangement, that is, it is possible to allocate markers which refer to the application. Furthermore, the measurement arrangement makes sample management and documentation possible without expensive editing processes.

10 Claims, 2 Drawing Sheets

REMOTE CONTROLLED MEASUREMENT ARRANGEMENT AND PROCESS FOR REMOTE CONTROLLED OPERATION OF SEVERAL MEASURING POINTS

CROSS REFERENCE

This application is a continuation-in-part of U.S. patent application Ser. No. 08/873,407 filed Jun. 12, 1997 and which is herein incorporated by reference in its entirety.

BACKGROUND OF THE INVENTION

This invention relates generally to a remote controlled measurement arrangement and process for operating such a system. More particularly, this invention relates to a remote-controlled measurement arrangement, which includes several separate measuring points which communicate with a central control, wirelessly as well as a process for operating same.

Currently, measurement arrangements generally require a great number of measuring points, which are controlled from a central control. Current and prior art control systems require that the measuring point, in order to be controlled at the central control, be assigned a measuring point marker for the measuring point application (sample) which is to be communicated to the central control. Often, these measuring point markers are set into the central control as fixed addresses at each measuring point (sample). It is then necessary to report the measuring point marker to the central control unit in connection with the individual application (sample), either manually or via a bar code reader in order to report the reading (sample) to the central control unit.

There are inherently several drawbacks to the foregoing discussed prior art. For one thing, the process is relatively complex. In the case of manual input, there is much danger of errors. Also, bar codes can be detached or otherwise removed at the measuring points (sample) which can lead to incorrect readings of these measuring points (sample). The aforementioned and other possible errors result in incorrect sampling readings at the measuring points. For this and other reasons, there is a perceived need for an improved measuring point arrangement and a process for remote controlled operation of the several measuring points.

SUMMARY OF THE INVENTION

The above-discussed and other problems are deficiencies of the prior art are overcome or alleviated by remote controlled measurement arrangement and process for remote controlled operation of several measuring points of the present invention. In accordance with the present invention, a remote controlled measuring arrangement and a process for operating several measuring points communicate wirelessly with a central control.

Two different types of data transfer are provided. The first type of data transfer takes place between a data transfer device and each individual measuring point. This data transfer requires close physical relationship between the data transfer device and the measuring point. The measuring point is provided with a measuring point marker, which can be retrieved within the framework of this data transfer.

The second type of data transfer then takes place between a central control unit and the measuring point (marker). Measurement data, control data, and if necessary, configuration data are transferred within the framework of this second data transference. The measuring point marker can be made application specific or sample specific by means of this invention and choice of measurement arrangement. That is, it is possible to allocate measuring point markers which refer to the specific application. Furthermore, a well chosen measurement arrangement makes sample management and documentation possible without expensive editing processes.

The above-discussed and other features and advantages of the present invention will be appreciated and understood by those of ordinary skill in the art from the following detailed discussion.

BRIEF DESCRIPTION OF THE DRAWING

The present invention will now be described, by way of example only, with reference to the accompanying drawings in which.

DESCRIPTION OF THE PREFERRED EMBODIMENT

Figure 1:
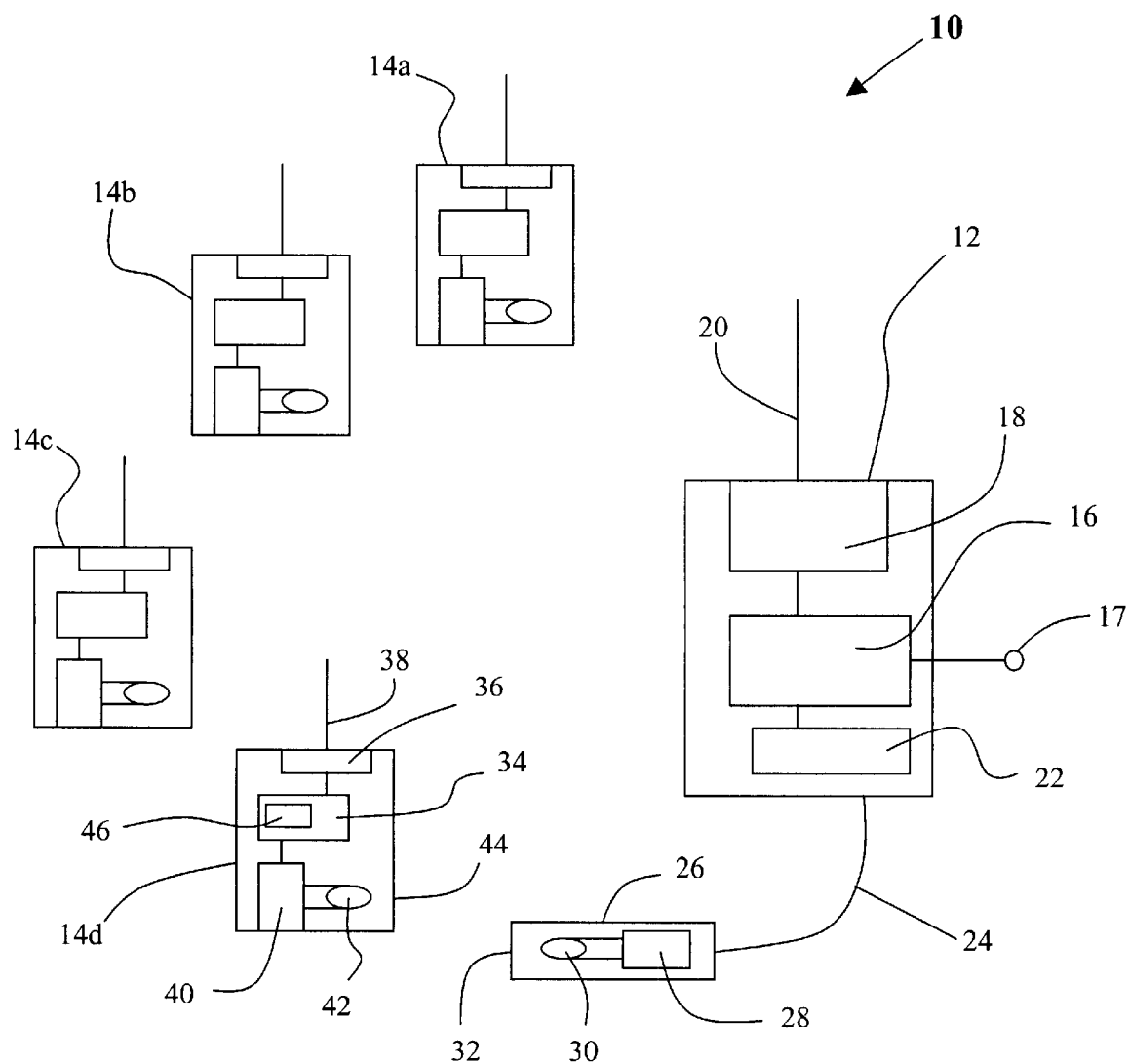
FIG. 1 is a schematic diagram of a measuring arrangement according to a first embodiment of the present invention.

The goal of the present invention is to provide a measurement arrangement and a process for operating this measurement arrangement to ensure an extremely reliable application/measuring point (sample) arrangement that provides largely automated control of many measuring points and is suitable for a wide variety of different applications. Additionally, this invention provides automated sample management and evaluation and requires no start-up or alteration of the measuring system.

This invention is comprised of a remote controlled measuring arrangement which includes several measuring points, which communicate wirelessly with a central control unit. Two different types of data transfer are provided in accordance with an exemplary embodiment of this invention. The first type of data transfer takes place between a data transfer device and each individual measuring point. This first kind of data transfer requires a close physical relation (short range) between the data transfer device and the measuring point. A coordination or identification of the measuring point takes place within the framework of this data transfer. Thus, an anonymous measuring point is provided with a marker, e.g., by means of the central control. Any other feature and/or marker or identification (such as an imprinted serial number) could be sensed by the appropriate measuring point (e.g., read during a production run by the control unit) and the coordination would take place later within the framework of the application.

Then the second type of data transfer between a central control and each measuring point is provided, this data transfer being realized without a close physical relation between the transmitter/receiver of the central control and the measuring point. Measurement data, control data, and, in a given case, configuration data are transferred within the framework of this second data transfer. The marker can be made sample specific by means of this procedure of measurement arrangement, that is, markers can be made, respectively assigned, which have reference to an application. Furthermore, the measurement arrangement makes a sample management and documentation possible without expensive editing processes.

In accordance with the invention, the coordination of a measuring point with an application is not system-oriented, but rather is application oriented. This means that before the measurement, the measuring points still have no marker. In order to coordinate a marker with the measuring points and/or to transfer a marker which was imprinted already at the time of producing the devices, it is necessary that the e.g., mobile data transfer device be brought to the measuring point, so that definite physical contact or a definite physical relation between the data transfer device and the measuring point arises. Of course, either the data transfer device may be stationary and the measuring point may be mobile or both the data transfer device as well as the measuring point may be mobile. Only this definite physical relation permits a data transfer between data transfer device and the measuring point. Marker information is exchanged and coordinated within the framework of this data transfer, which at the same time, in each case, can function only with an individual measuring point. The measuring point is accessible via the marker data stored during the marking procedure or e.g. via an individual serial number of each measuring point which is associated during the marking process in the central control device to a probe to be analyzed. Since this coordination takes place in an application-oriented fashion, there is no manual operation and, respectively, coordination with or by system related marker data, which have nothing to do with the logic of the sample selection. Any measuring point now can be used for any application, a marker allocation being made only with the data transfer via the date transfer device, which marker then can be sample related. In this way it is possible to use measuring point designations such as Ox1, Ox2, Ox3, etc. in the case of oxygen measurement and Stick1, Stick2, Stick3, etc. in the case of nitrogen measurement, and BOD, in the case of analysis of biochemical oxygen demand. The markers can contain substances, sampling places, and concentrations and/or other parameters. After any number of measuring points have been provided with a marker in the above-mentioned way, these measuring points can be addressed between the central control and the individual measuring points, as opposed to the marker assignment of a measurement point, not being connected with a specific physical condition between the central control and the measuring point. In the case of using an IR data transfer, for example, an infrared transmitter/receiver can be assigned to the central control outside of the glass door of a climate cabinet, while the applications take place within the cabinet. In the case of using a radio device, a corresponding transmitter/receiver can be located at any point in the room or in the building. It is essential that only such measuring points be actuated which have been provided previously with a marker within the framework of a marker assignment, respectively the marker of which has been read into the control. This marker serves for the central control as response addresses for all subsequent data transfer processes.

Different types of data can be transferred within the framework of the data transfer between the central control and the measurement points.

1) Group affiliation data, which communicate to a measuring point with a specific marker that this application belongs to a specific group. Several measuring points in the measuring arrangement can be addressed intentionally at the same time by means of such an assignment of a group address.

2) Control data, which serve for communicating to the measuring point the moment and/or the type, respectively parameters of a measurement or a measuring program. There are two different possibilities here. In the case of using very simply constructed measuring points, the measuring points can be switched on, e.g., for each measuring process, from the central control whereupon the measuring points perform a measurement and transmit the measurement result to the central control. Then the measuring point can be reset either by the central control or internally to a stand-by operation, in which the measuring point uses very little current.

In another embodiment, a complete measuring program can be transferred by the central control to a measuring point, in which case the measuring point automatically services the measuring program without further help of the control. Of course, in this case a timer, e.g., a cycle source, in the measuring point is necessary so that the measuring point can meet time assignments. Furthermore a program already stored in the measuring point may be started. The last alternative makes possible an operation independently release from the central control for the measuring points, while, on the other hand, this alternative itself is connected with a higher hardware expenditure at the measuring point. Thus, this solution requires a more intelligent microprocessor control with several memories and a control logic, while the first alternative requires only a very simple control with very little memory space, which again has a favorable influence on energy consumption.

Preferably, a data transfer is acknowledged by the measuring point. This can take place by means of sending an acknowledgement data record. In this way, it can be assured that the data to be transmitted were received, respectively processed by the measuring point.

Preferably, the data transfer is acknowledged by the measuring point by use of an acknowledgment device which acknowledges the successful assignment of a marking. The acknowledgment device also preferably includes a display for the marker.

In this connection it is noted that the measuring point as a rule are battery or accumulator operated. In other words, the measuring points are preferably but not necessarily battery or accumulator operated. For example, the central control unit may be mobile and the measuring points may be stationary devices in a laboratory or elsewhere. Therefore, an important requirement of the operation of the measuring arrangement consists in the fact that the measuring points use as little current as possible in order to avoid a more frequent recharging of the accumulators, respectively replacement of the batteries.

A third type of data, which is to be transmitted between the central control and the measuring points, is measurement data which is generated by the measuring points in the course of measurements. This data can also include data concerning the status of the measuring points, internal current supply, so that, e.g., before the beginning of a measurement, it is possible to check if the measuring point is in the position to carry out the measurement to the end without interruption with the current battery or accumulator status.

In any case, the sample assignment is clear as a result of the definite marker assignment, and all assigned measuring points can be supplied with the necessary control data without further manual access, respectively measurement results obtained can be extracted from the central control without manual access to the respective measuring point. The measuring arrangement in accordance with the invention, respectively the process in accordance with the invention, permits a continuous documentation of the measurements and the measurement results in connection with any statistical evaluations, which are given on the basis of the unlimited hardware possibilities of the central control. A faulty manual coordination process, such as exists in the current systems, thus can be eliminated. Therefore it is not necessary to coordinate the measuring head with the designation, e.g. E 07 B of the application settling basin 1, but the measuring point can also be provided with the marking "settling basin 1".

Group coordination of specific measuring points can be realized in two different ways. On the one hand, the definition of the group can be stored in the central control, so that, when the entire group is to be addressed, the control calls up the individual markings belonging to the group. In another process, there is a memory for a group address at each measuring point, in which case the central control sends the group address only before the data transfer, in which case, each measuring point is addressed with the same address. This can be determined by means of a simple comparison of the received group address signal with the group address signal located in the memory. The group address signal can have been assigned to the measuring point by the central control ahead of time within the framework of configuration data transfer.

In an advantageous further development of the invention the central control can be designed to emit a switch signal which optionally also is received by measuring points which still are not provided with a marker. The measuring point is switched from a current saving stand-by operation into an active status by means of this switch signal. Of course, it is also possible to use this switch signal for switching off a measuring point or switching a measuring point to the stand-by operation.

A measuring point measuring system, which can be put into operation without system configuration activities by the user, is created by means of the present invention. A sample management and sample documentation without editing processes on equipment or measuring records can be carried out with the measuring arrangement and the process, by means of which sample management and sample documentation can be carried out reliably, rapidly and easily even in the case of a large number of measuring points. Therefore, accumulator operated and battery operated measuring heads can be used which are simply screwed or otherwise mounted onto sample containers.

Preferably, a modulated infrared transmission is used for the data transfer, by means of which external light effects can be excluded as much as possible.

Preferably, the same type of remote transmission is chosen for the transmission from the data transfer device to the measuring point as for the transfer from the central control to the measuring point and vice versa. The physical relation between data transfer device and measuring point can e.g. be assured by means of suitably designed complementary contact surfaces. The contact surface of the measuring point has to be easily accessible for sending/receiving head. The contact surfaces can be designed to that no infrared light, respectively no radio waves, between the contact points of the measuring point and the data transfer device reach outside to other measuring points. Moreover, the effect in an only limited area can be realized in the data transfer device by the fact that an infrared, respectively radio, transmitter, the range of which does not exceed e.g., 3 cm, with only very low transmission power is needed. According to the present invention, the very low transmission power has a corresponding short transmission range, e.g., less than about 40 inches, preferably less than about 2 to 5 inches.

In contrast to that, it is possible to use a transmitter/receiver which has a relatively high transmission power for the central control, so that all measuring points provided with a marker, respectively even the measuring points not provided with a marker, are reached.

Preferably, it is possible to check the signals received by the measuring point control by means of common comparators, which compare specific data of the received signals, e.g., the marker signal or a group affiliation signal, with the corresponding memory contents in the measuring point control. In the case of a positive comparison result, the measuring point is activated corresponding to the subsequent received control signals.

Furthermore, it is possible that the measuring points transmit only a maintenance signal to the central control when an internal test circuit in a measuring point determines a defective function of an individual part of the measuring point control, e.g., a defective function of the measuring sensor, such as, e.g., a pressure sensor or a partial gas pressure sensor, or if the battery, respectively accumulator, voltage drops under a specific value. In this way, it can also be assured that the measuring points operate satisfactorily.

Preferably all measuring points are switched from the switched-off status or stand-by operation to the active status by a switch signal (all call) emitted by the central control before the marker assignment. Then the marker assignment is made by the data transfer device in an individual call, whereupon the measuring points can be addressed selectively or in groups by the marker call from the central control.

Now turning to FIG. 1, in which an exemplary embodiment of the present invention is illustrated.

A preferred embodiment of the invention is described with reference to FIG. 1. FIG. 1 shows a remote controlled measuring arrangement 10 comprising a central control unit 12 and several measuring devices 14a to 14d which are preferably identical and can be controlled by the central control unit 12 independently from each other. The central control unit 12 comprises a control circuit 16, a broadcasting transmitter/receiver system 18 which has an antenna 20 for bi-directional broadcast transmission with the measuring devices 14a to 14d. Furthermore the control circuit 16 of the central control unit 12 is connected with an output 17 for a computer system and with a marking circuit 22 to provide the measuring devices with identification markers. On this behalf the marker circuit 22 is connected via an interface (cable) 24 with a marking unit (data transfer device) 26. The marking unit comprises a signal generator 28 which is connected to a coil 30 provided behind a data transmission surface 32 of the marker unit 26. The marker unit 26 may be provided with switches and so on for a manual operation of the marker unit 26.

Each measuring device 14 comprises a device control circuit 34 which is connected to a broadcasting transmission receiver circuit 36 comprising an antenna 38 for bi-directional broadcasting data transmission between the central control unit 12 and the measuring device 14. Further, the measuring control circuit 34 is connected to an identification circuit 40 which is connected to a transmitter/receiver coil 42 provided behind a transmitter/receiver surface 44. Further the measuring device 14 may comprise a display 46 for showing measured values, time values or status values as for example an acknowledge signal after successful marking by means of the marker unit 26.

The function of the system is described hereinafter. Before the measuring arrangement is able to operate it is necessary that each measuring device 14a to 14d is provided with an identification mark so that the central control unit 12 is able to control and receive measurement signals from a specified measuring device. On this behalf the marker unit 26 of a central control unit is brought with its receiver/transmitter surface 32 brought in contact or in close physical relationship with the receiving transmitter surface 44 of one of the measuring devices 14a to 14d. By the fact that the data transmission between the marker unit 26 and the measuring device 14 via the coils has a relatively short range of transmission only one measuring device can be provided with a specific identification marking via the marking unit 26. In one exemplary embodiment, the short range of transmission is a transmission range less than about 10 inches and preferable the short transmission range is less than about 2 inches. It also within the scope of the present invention that the measuring device may contact the marker unit 26 in order for the transfer of marker data from the marker unit 26 to the measuring point. To the other measuring devices 14a to 14d the same identification marking cannot be allocated even if these are located close to the marker unit. By bringing into contact the transmitter/receiver surfaces 32 and 44 of the marker unit 26 and the measuring devices 14a to 14d each measuring device is provided with its own identification marking which is different from that of all other measuring devices. In other words, by means of the close physical connection of the marker with 26 to the measuring point, it is not possible that other measuring devices may achieve the same marking signal. A successful transmission of an identification marker may be shown by the measuring device 14 via the display 46 which is preferably a liquid crystal display. Now, the central control unit 12 is able to contact the measuring devices via its broadcasting transmission/receiving circuit 18 independently. Therefore, with one control unit 12 several measuring devices can be controlled and read out. The specified addressing of particular measuring devices is possible by adding the identification marker to a control signal which is accepted only by the particular measuring device with the same identification marking. Even when the measuring device sends a measuring signal or some other parameters to the control unit 12 this information includes the identification marker or a similar identification data of this measuring device so that the control unit 12 is able to associate a received measurement signal with a particular measuring device. The broad-casting system 18, 20 of the control unit and the broadcasting transmitter/receiver system 36, 38 of each measuring device 14 has a sufficiently long range to allow bi-directional communication between the control unit 12 and all active devices even when they are located remote from each other, for example in different rooms. According to the present invention, the long range of transmission comprises a range suitable for the desired bi-directional transmission and it is understood that the large range is greater than the short range. In another embodiment the control unit 12 addresses a particular measuring device to start a read out of data. In this case it is not necessary that the data transmitted from the measuring device is provided with identification data, as the control unit 12 knows from the precedent addressing that this data can only be the data of the addressed measuring device. In this embodiment only the transmission data of the central control unit 12 must comprise any identification or addressing data.

Of course it is not necessary that the marker unit 26 of the control unit 12 is connected to the control unit 12 via interface (wire) 24 but there may be also the possibility of a remote connection. Further it is not necessary that the marker unit 26 is connected to the control unit 12 during the operation of marking the devices. Therefore the signal processor 28 of the marker unit 26 may even have a storage for receiving marking data from the marking circuit 22 of the control unit 12 before the marking operation whereas the connection is not necessary during the operation. This storage may also be provided for storing acceptance signals of the measuring devices after a successful marking operation. These data may be read out by the control unit 12 after the marker unit 26 is brought again into contact with the marker circuit 22 after the marking operation.

Figure 2:
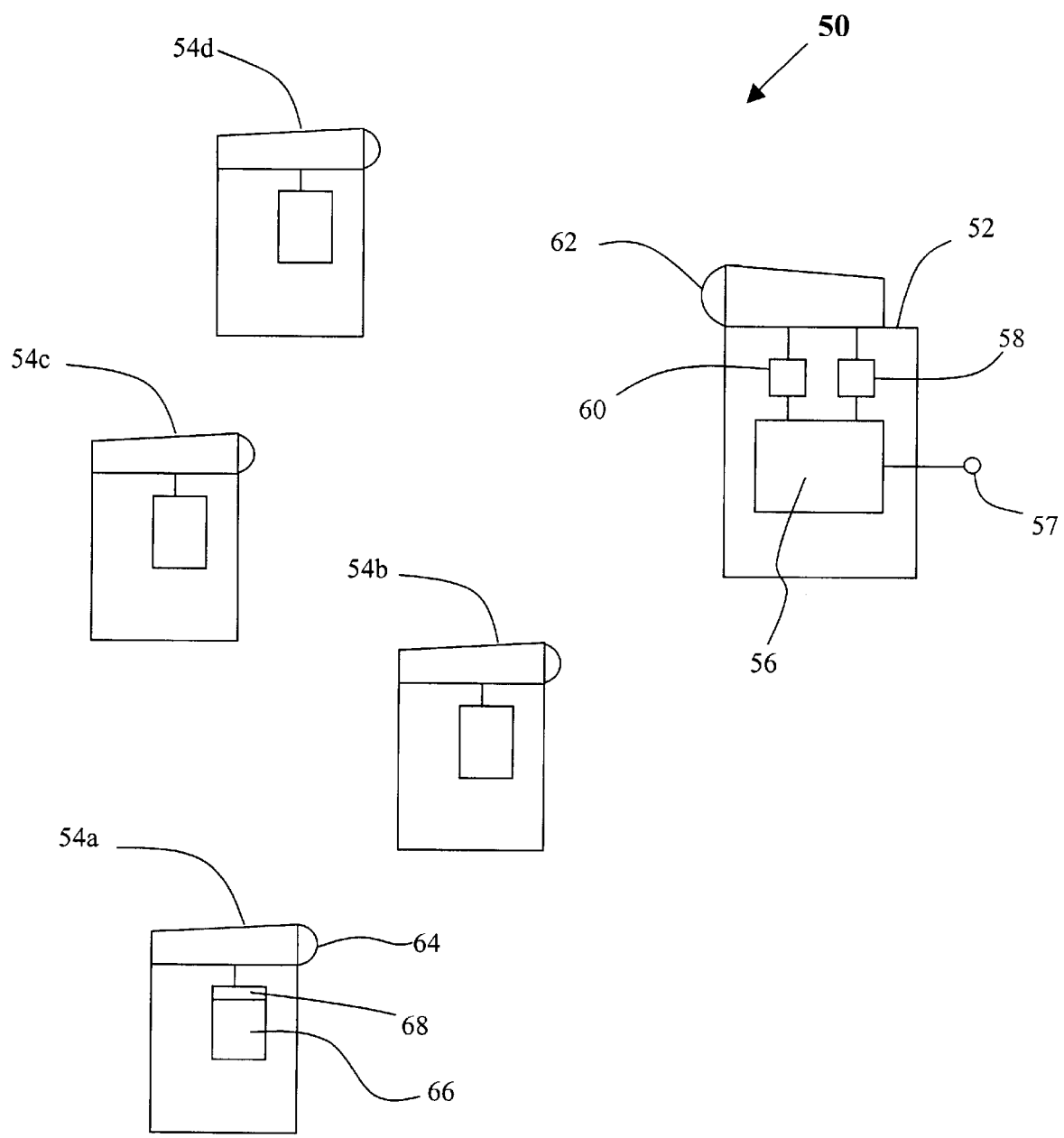
FIG. 2 is a schematic diagram of a measuring arrangement according to a second embodiment of the present invention.

FIG. 2 shows a second embodiment of a measuring arrangement 50 comprising a central control unit 52 and a couple of identical measuring devices 54a–54d. The central control unit 52 comprises a central processing unit 56 which is connected to a first communication circuit 58 for bi-directional communication between the central control unit 52 and each of the measuring devices 54a–54d. Further the central processing unit 56 is connected to a marker unit 60, which is provided for generating and receiving signals in course of a marking or a identification process of a measuring device 54a–54d. The transmission circuit 58 as well as the marking circuit 60 are connected to a infrared transmission/receiving system 62 which is able to communicate with a infrared transmitting/receiving system 64 of the measuring devices 54a–54d. Each measuring device has a central processing unit 66 and a marking circuit 68 which are both connected to the infrared transmission/receiving system.

The central processing unit 56 of the central control unit 52 is further provided with an interface 57 for bi-directional communication with a personal computer or any other processing display or input/output device.

The function of the arrangement is described as follows. Each measuring device 54a to 54d is provided to make a physical and a chemical measurement of a water or a waste water probe. The measuring device may for example be a device for determining the biochemical oxygen demand of a waste water. Each measuring device is filled with the desired probe. Thereafter the measuring devices 54a to 54d must be provided with a particular marking or an existing marking of each measuring device, for example a serial number has to be transmitted to the central processing unit such that central processing unit is able to allocate control signals and received measurement signals to a particular measuring device. Therefore the central control unit 52 has a marking circuit 60 which provides the infrared transmission/receiving system 62 with a very low signal such that the range of the output signal of the infrared system 62 is only very short, for example 3 cm. Now each measuring device 54a to 54d is brought with its infrared transmission/receiving system 64 in immediate vicinity to the infrared transmission/receiving system 62 of the central control unit. The range of that infrared transmission/receiving system of the central control unit 52 is according to the very low signal of the marking unit 60 so short that only one of the measuring devices 54a to 54d is able to be brought into the range of the infrared transmission/receiving system 62 of the central control unit 52 at a time. Now either the measuring device is provided with a marking or by means of the signal of the marking unit 60 the marking unit 68 of the measuring device 54a is initiated to give out an existing marking (e.g. serial number, address etc.) to the central control unit 52. The exchange of marking information is confirmed by handshake signals so that the system is able to verify a correct allocation or exchange of marking information. The marking procedure according to the above method is repeated with each measuring device whereby each measuring device obtains a separate marking or communicate its particular marking to the central control unit.

After the marking procedure is finished the measuring devices 54a to 54d are located in their measuring places for example in a climatic test cabinet. Now the bi-directional communication between the central control unit 52 and each measuring device 54a to 54d is performed via the same infrared transmission/receiving system 62 and 64.

Now the signals outputted from the central control unit 52 are processed and received via the transmission circuit 58 which provides the infrared transmission receiving system 62 of the central control unit 52 with a much stronger signal so that the range of the infrared transmission/receiving system is now in the region of several meters so as to allow a communication with each of the measuring devices when they are located in their normal test locations. For example, the transmission circuit 58 permits a large (long) range of the infrared transmission/receiving system, e.g., ten meters. The central control unit 52 thereby provides control signals, for example signals to initiate an output of a measuring result via a particular measuring device. At least each signal transmitted via the central control unit 52 comprises an address (e.g. marking or serial number) which is directed only to certain marked measuring device. If the measuring device works in an answer mode after being addressed by the central control unit 52 its transmission signals to the central control unit need no addition of identification data. The marking process can be initiated manually or via a personal computer via the interface 57. Although there are other possibilities of initiating a marking procedure. It is for example possible that a marking process is initiated automatically when a measuring device which is not yet allocated is being brought into the immediate vicinity of the central control unit.

After the test is finished it is possible that the marking information in the central control unit 52 is deleted automatically, for example after a certain time lapse after finishing the test. Or the marking information in the central control unit 52 is deleted manually after the test has been finished.

It has been shown that the difference between common data transfer and marking data transfer can be realized by the broadcast transmission system of the central control unit by providing two output power ranges for the sended signals, a low one for marking data exchange and a high power output for common data exchange. By providing this two-stage transmission system it can be realized that the low-output sending signals of marker data only reach one measuring point standing nearby within the low-range transmission area, while the sending of common data with the high power output is received by all measuring points. The provision of two sending signals with a different receiving area may not only be obtained by modifying the output power but even by modifying the wavelength of the transmitted carrier signals, particularly if using infrared wavelength, as different wavelengths provide different receiving areas.

Furthermore, it is to be stated that single components of the above-mentioned embodiments may be realized as a program structure in a more or less computerized central control unit.

While preferred embodiments have been shown and described, various modifications and substitutions may be made thereto without departing from the spirit and the scope of the invention. Accordingly, it is to be understood that the present invention has been described by way of illustrations and not limitation.

What is claimed is:

1. A process for the remote controlled operation of several separate measuring points, which communicate with a central control wirelessly, comprising:

providing an individual measuring point with a marker using a data transfer device, the resultant data transfer requiring the data transfer device to be within a short range of the measuring point, the data transfer device being interfaced with the central control;

the central control communicating only with the measuring points already provided with a marker and wherein measurement data and control data are transferred without requiring the central control to be within the short range, wherein the central control communicates directly with the measuring points; and transmitting a measuring program to a measuring point from the central control, whereupon a control of the measuring point starts an internal timer, which carries out several measurements at programmed times and in between then drops back into a measurement stand-by operation, in which only parts of the control, the timer, a measure value memory, and, optionally, the transmitter/receiver are activated.

2. The process of claim 1 wherein:

the central control or the data transfer device switches the measuring point(s), before the assignment of a marker, from a stand-by status, in which only the transmitter/receiver of the measuring point and corresponding parts of the control are activated, into an active status.

3. The process of claim 1 wherein:

the granting of a marker and/or the receiving of control data are acknowledged by the measuring point.

4. The process of claim 1 wherein:

at least one of the allocation of a marker and the reception of control data is acknowledged by the measuring point.

5. The process of claim 1 wherein:

after processing a measuring program, the measuring point control either transmits the measurement data to the central control and switches off, or is switched to stand-by operation.

6. The process of claim 1 wherein:

groups of measuring points with a marker are determined in the central control or within the framework of the configuration of the measuring points, which groups are actuated together in the case of at least one of a following transfer control and configuration data.

7. The process of claim 1, wherein:

the short range comprises a transmission range of less than about 10 inches.

8. The process of claim 1, wherein the measurement data and control data are transferred at a long transmission range which comprises a transmission range greater than the short range.

9. A remote controlled measuring arrangement comprising:

a plurality of measuring points; and a central control which communicates wirelessly with the plurality of measuring points, the central control having a first transmission mode for assigning marker data to individual measuring points, the first transmission mode having a short transmission range to limit the marker data transfer between the central control and a single predetermined measuring point, the central control having a second transmission mode for bi-directional communication between the central control and marked measuring points, wherein the second transmission mode has a long transmission range to permit data transfer to all of the marked measuring points, wherein the central control communicates directly with the plurality of measuring points during operation in both the first and second transmission modes.

10. The measuring arrangement of claim 9, wherein:

the short transmission range is less than about 40 inches.

* * * * *